United States Patent [19]

Leach

[11] Patent Number: 4,726,860
[45] Date of Patent: Feb. 23, 1988

[54] METHOD OF MAKING MIRROR LAMINATES

[75] Inventor: Roger J. Leach, Surrey, England

[73] Assignee: Chelsea Artisans Limited, Surrey, England

[21] Appl. No.: 799,117

[22] PCT Filed: Mar. 8, 1985

[86] PCT No.: PCT/GB85/00097
§ 371 Date: Nov. 4, 1985
§ 102(e) Date: Nov. 4, 1985

[87] PCT Pub. No.: WO85/04132
PCT Pub. Date: Sep. 26, 1985

[51] Int. Cl.⁴ .............................................. B32B 31/14
[52] U.S. Cl. ...................................... 156/87; 156/286; 156/382; 350/641; 428/304.4; 428/912.2
[58] Field of Search .................. 156/87, 71, 286, 382; 350/611, 641; 428/304.4, 912.2

[56] References Cited
U.S. PATENT DOCUMENTS 1,890,166 12/1932 Shatto et al. .................... 350/611
3,493,451 2/1970 Beery .............................. 156/286 X
4,328,276 5/1982 Swarovski .................... 428/912.2 X
4,350,545 9/1982 Garabedian ........................ 156/87
4,362,587 12/1982 Baudin et al. ...................... 156/87
4,422,893 12/1983 Duchateau et al. ......... 428/912.2 X
4,425,406 1/1984 Palma ............................ 156/382 X
4,465,734 8/1984 Laroche et al. ................ 156/79 X
4,469,737 9/1984 Kain ............................. 156/285 X
4,550,986 11/1985 Leach ................................ 350/641

FOREIGN PATENT DOCUMENTS 2038708 7/1980 United Kingdom .
2048166 12/1980 United Kingdom .
2120974 12/1983 United Kingdom .

Primary Examiner—Robert A. Dawson
Attorney, Agent, or Firm—William C. Long; Bruce M. Collins

[57] ABSTRACT

The invention relates to a method for bonding a mirror to a substantially rigid backing board using a solvent-based adhesive with solvent vapors being removed through a porous layer between the mirror and the backing. Apparatus for carrying out the bonding is provided. The mirror laminate is also claimed.

6 Claims, 8 Drawing Figures

METHOD OF MAKING MIRROR LAMINATES

This invention relates to the production of mirror laminates of the kind in which a mirror is adhesively bonded to a substantially rigid backing board such as of wood, foamed or un-foamed plastics or fibrous plaster, or other support surface such as a wall or ceiling of a building, and to apparatus suitable for use with the method.

For the avoidance of doubt, the term 'mirror' as employed herein relates to products of the kind comprising a transparent facing sheet, e.g. of glass or plastics, to the back of which has been applied a reflective surface. The reflective surface may be of metal, e.g. silver or copper or may be of any other suitable material e.g. gloss paint.

To accommodate differential thermal expansion between the mirror and the support, especially where the mirror has a large surface area, it is desirable to employ an adhesive which will give a flexible bond. Most such adhesives, however, are solvent-based; that is, they include a solvent which must be evaporated to attain the desired properties of the bond. Moreover, the solvents which are commonly used in these adhesives tend to attack the coating, e.g. of metal or paint, which provides the reflective surface of the mirror.

The mirror is, of course, non-porous and therefore where the backing board or other support surface is also non-porous or substantially so, that least some of the solvent tends to be trapped in the region of the bond line. Accordingly, with the passage of time, areas of the reflective coating are damaged or destroyed. Sometimes, the defect only materialises after a substantial period of time.

If solvent-free adhesives are used, on the other hand, e.g. adhesives that are formed by mixing together two materials one of which contains a polymerisable component and the other of which contains a catalyst for the polymerisation, the bond itself tends to fail after a relatively short period, e.g. 12–18 months.

There has therefore been a need to find a method of employing solvent-based adhesives which reduces the tendency of the solvent to attack the reflective coating.

According to the present invention, there is provided a method of bonding a mirror to a substantially rigid backing board or other support surface by means of a solvent-based adhesive, the method comprising forming the laminate of mirror and said support surface with a layer of porous material between and including the step of bonding the mirror and/or the backing board or other support surface to the layer by means of a solvent-based adhesive and extracting adhesive solvent vapour from the bond line of the assembly so formed by suction through the porous layer which for convenience is also referred to below as a porous membrane.

The invention is particularly applicable to the formation of transportable laminates of the kind in which a mirror is bonded to a backing board. However, it may also be employed in the lamination of mirrors in situ to support surfaces such as the walls and ceilings of buildings.

While it is possible to form the laminate of mirror, porous membrane and backing board or other support surface in one operation, in general the method will involve a first step in which one or other of the mirror and the backing board or other support surface is bonded to one face of the porous membrane and a second step in which the other of the mirror and the backing board or other support surface is bonded to the other face of the porous membrane. A solvent-based adhesive may be employed in either or both of the steps. Where it is employed in the first step, the best results are obtained if the extraction of adhesive solvent vapour from the bond line formed in that step is effected before the second step is carried out. Where a solvent based adhesive is employed in the second step, it will be appreciated that the extraction of the adhesive solvent vapour from the bond line formed in that step must be performed on the resultant laminate and that accordingly only the edges of the membrane are available for withdrawal of the vapour. Nevertheless the method of the invention is effective in extracting the vapour.

A particularly preferred method comprises the steps of (1) bonding a face of the membrane to a face of a substantially rigid backing board using a solvent-based adhesive and extracting adhesive solvent vapour from the bond line of the assembly so formed by suction through the membrane, (2) applying a solvent-based adhesive to the other face of the membrane and causing or allowing it to become at least touch dry, (3) applying a solvent-based adhesive to the back of the mirror, and (4) before the adhesive applied in step (3) has dried bringing together the adhesive-coated surface of the mirror and the adhesive-coated surface of the product of step (2) and extracting adhesive solvent vapour from the bond line of the assembly so formed by suction through the membrane.

For some applications, and particularly where the support surface is the wall or ceiling of a building, it is desirable to bond the membrane to the mirror and then store the product for subsequent sale or use. According to another aspect of the invention, therefore, there is provided a method of forming a porous membrane-backed mirror for subsequent bonding to a backing board or other support surface, the method comprising bonding the back of the mirror to a layer of porous material by means of a solvent-based adhesive and extracting adhesive solvent vapour from the bond line of the assembly so formed by suction through the porous layer (membrane).

In this aspect of the invention, it is generally desirable for the exposed surface of the membrane to have bonded thereto a flexible and substantially impermeable layer or skin which most preferably is plastics, particularly polyurethane or polyurethane-coated vinyl chloride polymer, so that the adhesive subsequently employed for bonding the membrane-backed mirror to the support surface and/or moisture in the support surface cannot permeate into the porous membrane.

The method of the invention may also be readily adapted to producing products which are particularly well protected against damage during storage, handling and transport if the porous membrane is of a size such that it extends beyond the edge of the mirror around the entire periphery thereof and a protective sheet for the transparent face of the mirror and which also is of a size such that it extends beyond the edge of the mirror around the entire periphery thereof is bonded to the exposed faces of the membrane surrounding the mirror simultaneously with the bonding of the membrane to the mirror.

Where a backing board is employed, the backing board may also extend beyond the edge of the mirror around the entire periphery thereof, thereby improving the protection against damage. The surplus membrane (and backing board if used) may be removed immediately prior to installation of the product at the desired location.

The invention is also particularly applicable to the production of laminates of the kind where a plurality of smaller pieces of mirror are bonded to a larger backing-board in a pattern to give a decorative effect. In the production of such laminates, it has been found important to leave small spaces, e.g. of the order of about 0.5 mm, between the adjacent mirror pieces and the reflective coating at the edges of these pieces can be particularly prone to attack by the solvent in the adhesive because the grinding or cutting employed to form the pieces from a larger sheet of mirror exposes the coating at these edges. The method of the invention assists the removal of adhesive solvent from the gaps between the individual pieces. Further improvement may be obtained if a sealant such as silicone rubber is applied between the spaces on the back surface of the mirror before the surface is contacted with the adhesive.

Any suitable material may be employed for the porous layer provided that (a) it has the necessary integrity and strength to support the mirror in place on the backing board or other support surface and (b) when it is bonded between the mirror and a non-porous backing board or other support surface, it is sufficiently porous to permit extraction of adhesive solvent vapour from a bond line, which has been formed between the layer and the mirror and/or the layer and the backing board (or other support surface) using said adhesive, through the exposed edges of the layer by suction. It will therefore be apparent that the layer cannot be too thin. The required thickness will depend upon the nature of the layer but usually will be at least 0.5 mm. On the other hand, if the layer is too thick, its ability to support the mirror on the backing board or other support surface is reduced. In general, suitable thicknesses will be in the range 0.5 mm to 5 mm, preferably 0.8 mm to 3 or 4 mm.

Examples of suitable materials for the porous layer are expanded or foamed plastics and rubbers with an open cell structure, porous sheets made of sintered particles, and woven and non-woven fibrous mats, webs or felts.

With suitable choice of the membrane, the laminate may also be given shockproof properties, making it particularly suitable for architectural applications in public places. The properties required of the membrane for this purpose depend upon the nature of the backing surface. Where the surface has a high resistance to impact, e.g. as in the case of chipboard or mineral board, a resiliently compressible membrane is desired. Where the surface has low impact resistance, e.g. as in the case of foamed polystyrene, polyurethane or polyisocyanurate, the membrane may also be resiliently compressible; however better results can be obtained if the membrane is chosen to have the effect of stiffening the support surface. Examples of suitable membranes of the latter kind are woven and non-woven fibrous mats, webs or felts.

Certain forms of membrane, e.g. the resiliently compressible plastics or rubber foams and the non-woven fibrous mats, webs or felts, also tend to retain the fragments in place when the glass is shattered, thereby reducing the danger caused by falling glass.

An increase in the ability to accommodate differences between the coefficients of thermal expansion of the mirror and the backing board or other support surface is obtained if the membrane is elastically deformable in the plane normal to its thickness. This is particularly advantageous where the laminate is of the kind employing a backing board and is intended for cladding walls or ceilings because in such cases it is desirable for the coefficient of thermal expansion of the backing board to be kept as low as possible.

However, where the membrane is easily deformable, e.g. can be stretched easily by hand, so that there is a tendency for it to be deformed during the lamination process, e.g. as in the case of some elastically deformable plastics or rubber foams, it is preferred that at least one surface of the membrane has a stabilising layer bonded to it, as described in our U.K. Pat. No. 2,048,166, otherwise, the membrane tends to deform during the production of the laminate.

It is also preferred that the membrane has good resistance to fire and spread of flame and does not emit toxic fumes when burned. One preferred class of porous membranes are fibrous in nature and comprise fibrous mats e.g. the non-woven fibrous mats marketed under the Trade Names "Terram", "Filtram" and "Melfab". Those formed largely or wholly of synthetic fibres are preferred. The fibres may be bonded together to form the mats in any suitable manner e.g. by heat or by adhesive or by a combination of both. Particularly preferred are fibrous porous membranes wherein the fibres are free or substantially free from nitrogen and halogen, especially hydrocarbon polymer fibres e.g. polyethylene and polypropylene.

Thus, further in accordance with the present invention, there is provided a mirror laminate comprising a mirror comprising a transparent sheet a face of which is provided with a reflective coating, said mirror being bonded to a substantially rigid backing board or other support surface e.g. such as a surface of a wall or ceiling of a building or of a partition, and, interposed between said mirror and said support surface, a porous interlayer comprising fibrous material and which is preferably resiliently compressible, more preferably also elastically deformable in the plane normal to its thickness, and also preferably free or substantially free of halogen and nitrogen atoms.

There is also provided a mirror structure suitable for bonding to a backing board or other support surface, the structure comprising a mirror comprising a transparent sheet a face of which is provided with a reflective coating, and a porous layer comprising fibrous material bonded to the exposed face of said reflective coating.

The reflective coating employed for the mirror may be a conventional metal coating, e.g. of silver, copper, gold or aluminium, a high gloss paint coat such as of the "Polyscreen" paints marketed by Sericole Inks of Fulham, England, or an enamel. The invention is of particular benefit where the transparent sheet of the mirror is glass but it is also applicable where transparent plastics sheets are employed.

The nature of the material of the support surface is not critical. For example, where it is a backing board, suitable materials are wood, wood laminates, foamed and unfoamed plastics and fibrous plaster. It may also be concrete, metal or stone. Preferred backing boards are light weight, substantially non-flammable, with a low coefficient of thermal expansion and easily cut. One preferred board construction is a sandwich of isocyanurate foam between two aluminium foil skins.

In a preferred method, the mirror laminate is produced as follows. Firstly, solvent-based adhesive is applied, e.g. by spraying, to the surface of the backing board to which the mirror is to be bonded; the membrane is then immediately applied to the coated surface, the bond between the membrane and the board is developed, e.g. by letting it stand or by applying heat.

The exposed face of the membrane is then coated with solvent-based adhesive and the coating is allowed to become at least touch dry. The adhesive-coated product so obtained can be stored in this state if desired. The back face of the mirror to be bonded to the board (i.e., the face having the reflecting coating) is then coated with solvent-based adhesive and, before this coating has completely dried, the coated surfaces of the mirror and membrane are brought together to complete the formation of the laminate and the product so formed is subjected to vacuum to exhaust solvent vapour from the areas of the bond lines in the laminate. Preferably the combination of backing board and membrane is also subjected to vacuum while the bond between the board and the membrane is being developed.

If the adhesive-coated backing board/membrane combination is larger and wider than the mirror, a protective layer, e.g. of plastics sheet or film or of cardboard, may be secured over the mirror surface at the same time as the mirror is bonded to the backing and bonded to the exposed surfaces of the adhesive-coated backing board/membrane combination surrounding the mirror, thus in effect encapsulating the mirror.

Where a pattern of smaller mirror pieces is to be bonded to a larger backing surface, the pieces may be arranged in the desired pattern face down upon a suitable support surface and an adhesive-coated backing-/membrane combination applied to the top of the pattern after application of the adhesive. Prior to the adhesive application, a jointing compound such as of silicone rubber may be applied to the gaps between the mirror pieces to reduce still further the likelihood of adhesive attack on the reflective coating at the vulnerable edges of the pieces.

To further reduce the chance of the reflective coating of the mirror being attacked by solvent in the adhesive, it is preferred to apply the adhesive to the back of the mirror by spraying using compressed gas, the pressure employed being above that normally used to spray the adhesive and such as to volatilise a substantial part of the solvent before the adhesive contacts the surface of the back of the mirror. Preferably the adhesive is already touch dry when it contacts said surface. Even in this form, however, it will contain solvent which needs to be removed. The pressure employed for spraying the adhesive will depend on the viscosity of the adhesive and the nature of the gas but where air is used, the pressure is suitably in the range of 45-60 psig for neoprene adhesives, i.e. about three times the normal pressure for spraying such adhesives.

The vacuum is conveniently applied by locating the laminate in an enclosure and reducing the pressure within the enclosure. If the enclosure has a flexible wall, reducing the pressure can collapse a flexible wall against a face of the laminate thus simultaneously applying pressure to the laminate in a direction normal to the plane of the bonds and assisting bonding.

Preferably, the laminate is supported on a rigid flat bed which has a surface area larger than that of the laminate and is provided, at least in a peripheral zone thereof which is not covered by the laminate, with ports opening into passages which can be connected to suction means such as a pump or fan. If the laminate and bed are covered by a flexible e.g. plastics sheet, evacuating the air from the space between the bed and the sheet will create a vacuum and assist exhaustion of the solvent vapours from the bond lines in the laminate by way of the porous membrane. Simultaneously, the sheet will be sucked down on to the upper surface of the laminate and assist bonding.

A suitable apparatus for the production of the mirror laminates of the invention comprises (a) first and second work stations each having a respective support means including a flat horizontal surface for supporting a substantially rigid sheet of material, (b) a third work station between said first and second stations and, (c) means for advancing said substantially rigid sheet from said first station through said third station to said second station, and wherein (d) said third station includes means for dispensing a liquid adhesive on to the top surface of a sheet being advanced through said third station, and, (e) the horizontal support surface of said second station is gas permeable and the station also includes a lid adapted to extend over said support surface, said lid comprising a substantially gas impermeable flexible cover movable between a first position in which said horizontal support surface is exposed and a second position in which said cover covers the support surface and means for withdrawing gas through the support surface from the space between said cover and the support surface when the cover is in the second position whereby to evacuate the space.

The cover assists the bonding of a laminate located at the second station by applying pressure to it when the space between the cover and the support surface is evacuated. Further, where, as in the mirror laminates of this invention, one of the layers of the laminate is porous, the evacuation assists extraction of the vapours of the adhesive employed in forming the laminate and which might otherwise attack one or more of the layers of the laminate.

Preferably the horizontal support surface of the first work station is also gas permeable and in addition to said second station having means for drawing gas through the support surface from above, one and preferably both of said first and second stations are provided with means for supplying gas under pressure through their respective support surfaces from below. By this means, an air cushion or air bearing may be provided under a workpiece to be laminated on the apparatus, thereby assisting its travel from the first station to the second station and reducing the likelihood of damaging its under surface. This is particularly important where the workpiece is glass e.g. a mirror sheet.

It is further preferred that the first work station, like the second station, has means for drawing gas through the support surface from above. Such means may be employed to hold a workpiece firmly on the surface by means of suction e.g. while carrying out a desired treatment on it.

In one embodiment, the apparatus includes means between the third station and the second station for applying a flexible sheet, such as the porous membrane of the mirror laminate of the present invention, to the adhesive-coated surface of a substantially rigid sheet being advanced from said third station to said second station. This may comprise means for supporting a roll of said flexible sheet above the path of said advancing sheet and so that sheet unwound from the roll hangs in the path of the advancing sheet, and a nip downstream of where the flexible sheet hangs in the path of the advancing sheet to engage said flexible sheet being advanced into said nip, by the nose of the advancing sheet, wrap it round said nose and press it to the upper surface of said advancing sheet. With this embodiment, means are also preferably provided for placing the flexible sheet under tension during its application to the upper surface of the advancing sheet, to avoid wrinkling or other distortion.

In general, it will be desirable to include driven, and preferably synchronously driven, sheet advancing means between the first station and the third station and between the third station and the second station. In general, each such sheet advancing means may comprise a pair of nip rollers at least one of which is driven and between which the sheet is passed. However, where it is desired to avoid applying pressure to the upper surface of an advancing workpiece between the third and second stations, e.g. because it comprises an exposed layer of adhesive or because the surface is delicate, the sheet advancing means which is between the third and second stations preferably comprises a motor driven roller adapted to engage the under surface of the advancing sheet, the roller being located in a trough the lip of which lies in a generally horizontal plane which is substantially coplanar with, but not above, the top of the roller and means are provided for drawing air from the trough whereby to suck the workpiece firmly down into contact with the roller.

The apparatus will now be described in greater detail with reference to a preferred embodiment and with the aid of the accompanying drawings in which.

Figure 1:
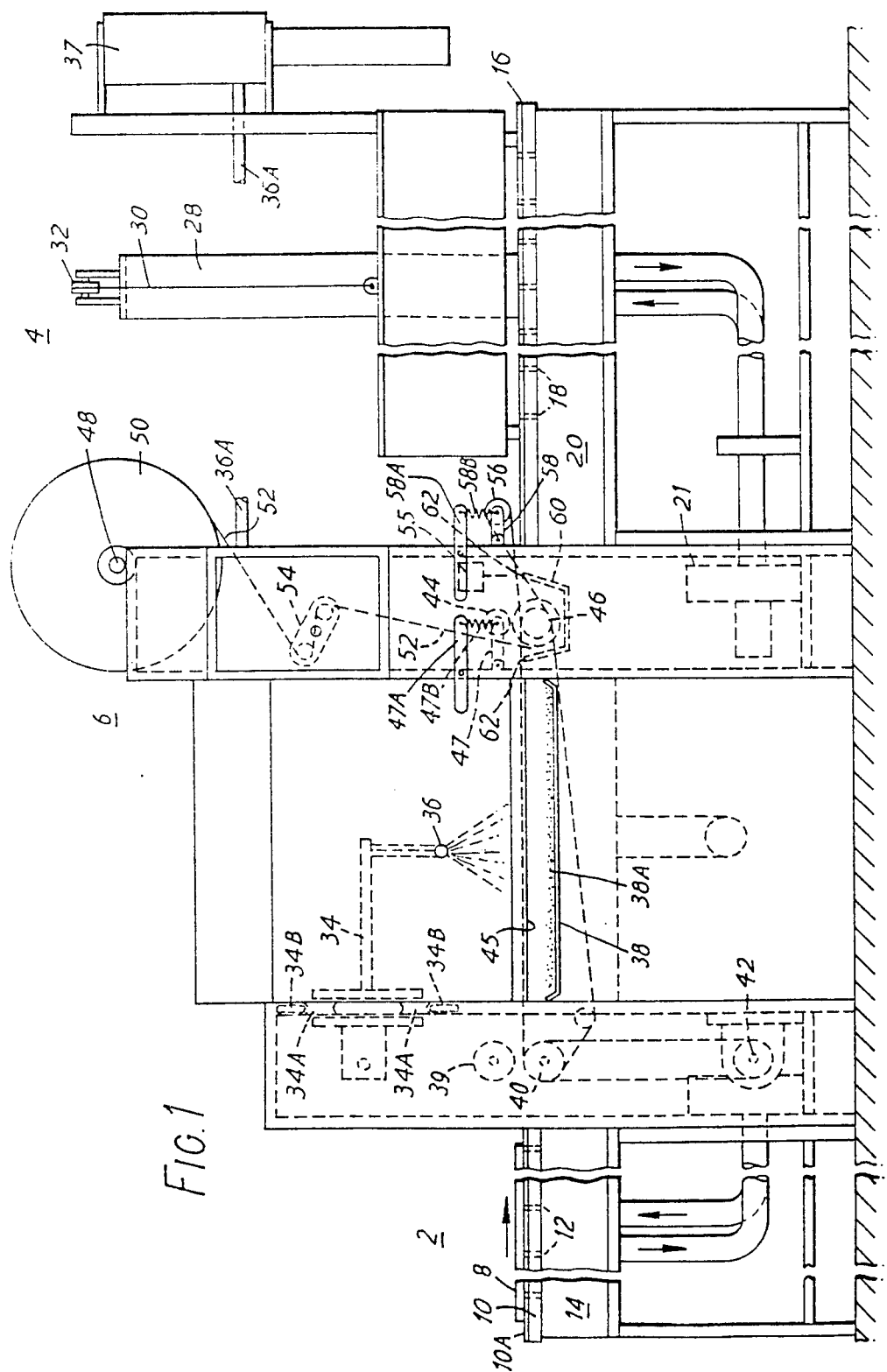
FIG. 1 is an elevational view, partly in cross-section, and part telescoped, of one form of apparatus according to the invention.

Referring to FIG. 1 of the drawings, the apparatus comprises a first work station 2 where the sheet to be laminated is initially located and a second work station 4 to which the sheet is advanced in the course of the lamination process. These stations are shown in telescoped form and each will normally be large enough to accommodate glass sheets of appropriate size e.g. 3 meters or more × 1.5 meters or more.

Between the first and second work stations is a third work station 6 containing the means for dispensing liquid adhesive on the sheet to be laminated. A sheet 8 is shown in position at the first work station.

Figure 2:
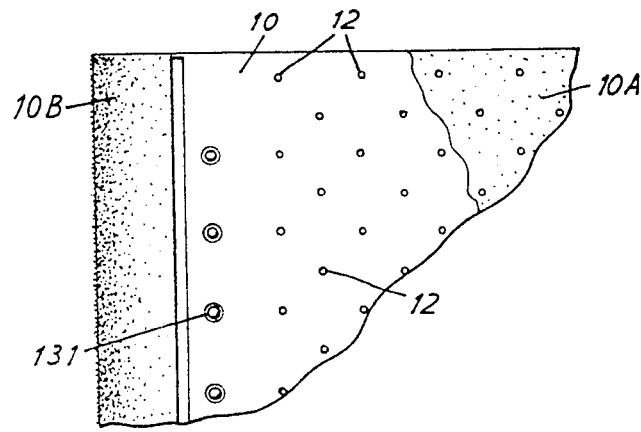
FIG. 2 is a plan view on a larger scale of a part of the first station of the apparatus, with the baize surface 10a cut away part to expose the table surface 10.
Figure 3:
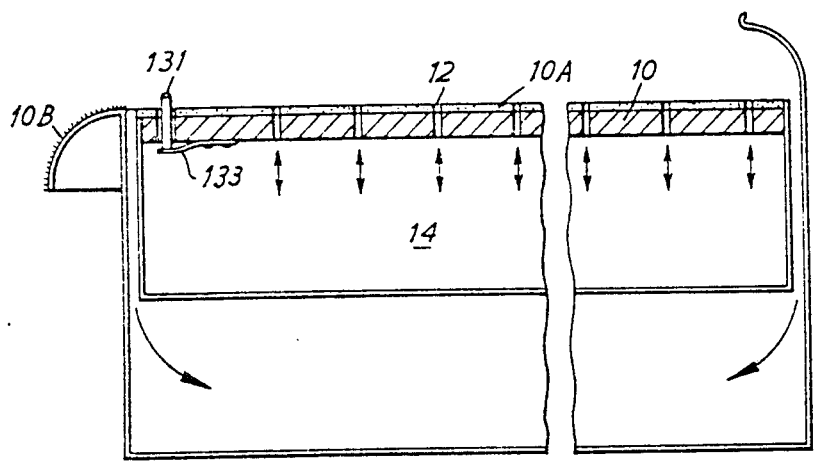
FIG. 3 is a cross-section at right angles to FIG. 1 of the first station of the apparatus.
Figure 4:
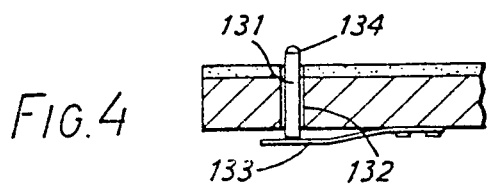
FIG. 4 shows a detail of the arrangement of FIG. 3 on an enlarged scale.

Referring to FIGS. 2 and 3, the first work station 2 comprises a flat horizontal table the top surface 10 of which provides a support surface for the sheet, e.g. sheet 8, to be laminated. The work surface of the table is made permeable to gas by the provision over its surface of a large number of ports 12 connected to passages which pass through the table top and open into a plenum chamber 14 which is located directly under the work surface and is connected to a pump (not shown) which can be switched to supply air at superatmospheric pressure to the plenum chamber and hence through the ports 12 in the table surface or to lower the air pressure within the chamber and thus suck air through the ports 12. The work surface is suitably covered by a porous textile sheet 10A, such as of baize or any other suitable material, to protect the surface of any sheet resting on it and may contain means for locating sheets so that they are subsequently advanced along a desired path through the third station and on to the second station. As illustrated in FIG. 4 such means conveniently comprise an array of pistons or pins 131 adapted to slide vertically in bores 132 provided in the support surface and which are resiliently biassed, e.g. by leaf springs 133 attached to the underside of the table, so that their upper ends normally project above the surface but can be depressed until the piston faces are flush with the work surface by application of downward pressure. The pins are suitably of nylon and have domed heads as shown at 134.

In order to assist the manhandling of a glass sheet into position on the table of station 1, the edge of the table nearest the operator may be curved as at 10B (FIG. 3) and covered with a soft protective material such as carpet or other similarly hard wearing textile over which the glass sheet may be slid without scratching or otherwise damaging its surface.

The first station may also include means for cutting sheets, especially glass sheets.

The structure and arrangement of the second station is similar to that of the first, comprising a flat horizontal table the top surface 16 of which provides a support surface for laminate advanced from the first station 2 through the third station 6. Said surface 16 is at about the same level as, or preferably a slightly lower level than, the surface 10 and is also made permeable to gas in like manner as surface 10 by the provision of a large number of ports 18 connected to passages which pass through the table top and open into a plenum chamber 20 which is located directly under the work surface and is connected to a pump 21 which can be switched to supply air at superatmospheric pressure to the plenum chamber and hence through the ports 18 in the table surface or to lower the air pressure within the chamber and thus suck air through the ports 18. The work surface 16 is preferably also covered with a porous textile sheet 16A such as of baize or any other suitable material, to protect the surface of any workpiece resting on it.

Suitably, the same pump 21 may be employed for both work station 4 and work station 2, with appropriate piping and control means to permit individual supply of either compressed air or suction to each station as and when required.

Figure 5:
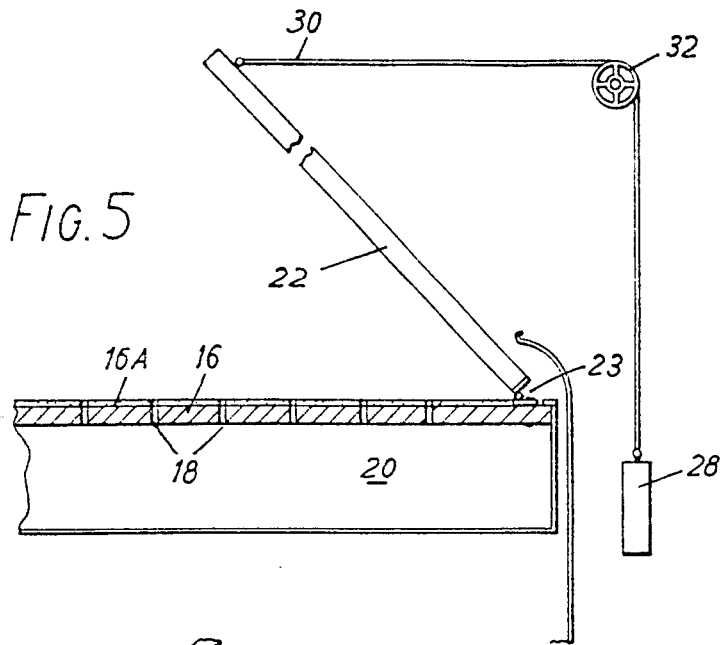
FIG. 5 is a cross-section at right angles to FIG. 1 through the second station of the apparatus.
Figure 6:
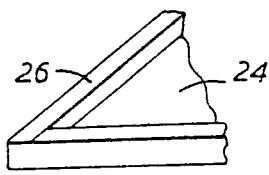
FIG. 6 is an enlarged perspective view of a detail of the arrangement of FIG. 5.

Table surface 16 at the second station is designed to be larger both in length and width than the largest laminate to be formed using the apparatus and to one long edge of the table is pivoted a lid 22 (FIGS. 5 and 6) comprising a flexible gas-impermeable sheet 24 such as of plastics film mounted in a frame 26. The lid is attached to the table top by piano hinge 23 to be pivotable between a first position in which it exposes the table surface 16 and a second position in which it rests on the surface 16. Preferably the lid 22 is counterbalanced e.g. by means of a hanging counterweight 28 which is attached to the top of the lid by wire 30 which passes over pulley 32. If desired, the lid may be opened and shut by hydraulic or pneumatic means, not shown.

The second station may also include means for cutting sheets, especially glass sheets.

Between the first and second stations is the third station 6 which is provided with liquid adhesive dispensing means generally indicated at 34. Conveniently, this comprises one or more spray nozzles 36 (only one is shown in the drawing) located at a suitable level to spray adhesive on to a sheet such as sheet 8 being advanced from the first work station to the second work station. The dispensing means may be mounted in any suitable manner for reciprocation, e.g. by mechanical, hydraulic or pneumatic means, in a direction transverse to the direction of advance of the sheet whose surface is to be coated with adhesive. As illustrated, it is mounted on wheels 34A which run on transverse rails 34B. Where more than one nozzle is provided, the nozzles may extend in a line generally normal to the direction of travel of the sheet or may be staggered or may be in any other suitable array. Alternatively, a fixed array of nozzles may extend transverse to the direction of travel of the sheet and means may be provided for selectively supplying adhesive to one or more of the array of nozzles according to the width of the sheet to be coated with adhesive.

Each nozzle is suitably connected by pipe-work 36A to a store of liquid adhesive and means such as pump 37 are provided for supplying the adhesive to the nozzle under pressure, e.g. by means of compressed air.

To avoid unnecessary loss of adhesive, means such as a photo-electric cell or microswitch (not shown) and actuated by the passage of a sheet to be coated with adhesive past a predetermined point or points, may be provided to start and stop the supply of adhesive to the nozzle(s).

To collect any adhesive overspill, a removable tray 38 may be located under the line of passage of a sheet moving through the third station and extending over the adhesive spray area. The tray may contain a layer 38A of sand or other cheap and readily disposable particulate material, on which the adhesive collects, which is replaced as necessary.

First means for advancing the sheet to be laminated from the first station to the second station comprise a pair of nip rollers 39, 40 which are located just downstream of the downstream end of the table of the first work station and are driven by a variable speed motor 42.

The second sheet advancing means, which is suitably located between the third and second work stations, also comprises a pair of nip rollers 44, 46 wherein the upper roller 44 is an idler and the lower roller 46 is driven by a variable speed motor which preferably is the same as the motor 42 driving roller 40 of the first sheet advancing means so that the rollers are driven synchronously. The upper roller 44 is mounted on a freely pivotable arm 47 so that the roller (a) may rest on the top of the workpiece by gravity, (b) automatically adjusts its distance from the other roller to accommodate workpieces of different thicknesses and (c) can be lifted away from the top surface of workpiece when desired. Lever 47A, which is connected to the roller axle by coil spring 47B, is provided for lifting roller 44 away.

It will be understood that the horizontal distance between the first and second sheet advancing means should be small relative to the length of the advancing sheet being treated so that more, and preferably substantially more, than half the length of the sheet is still supported at the first work station when the nose of the sheet engages the second sheet advancing means. Alternatively means are provided for supporting the advancing sheet at the third station. One suitable means comprise a plurality of strands of wire 45 extending in the direction of travel of the sheet. Means may be provided for passing an electric current through the wires occasionally to clean them of any adhesive deposited thereon, by burning.

Figure 7:
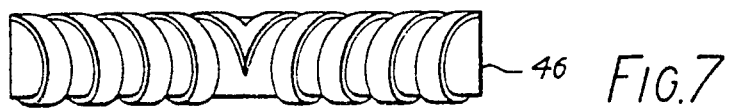
FIG. 7 is an enlarged plan view of the roller 46 of the apparatus of FIG. 1.

The diameter of roller 46 is sufficiently large that the angle between the leading edge of the advancing sheet and the tangent to the roller surface at the point at which the leading edge contacts the roller surface is small enough for the rotation of the roller to lift the edge up and forward and the edge does not jam against the roller. For this reason, the roller diameter will generally be larger than that of roller 44. Roller 46 also has means for maintaining the travel of the advancing sheet in a straight line, comprising a pair of opposed helical ribs extending from each end of the roller towards the centre on the roller surface, as shown in FIG. 7.

For use in processes where it is undesirable for any apparatus part to touch the upper surface of the advancing sheet, e.g. where an adhesive-coated sheet does not have an overlayer applied until it has arrived at the second work station, driven roller 46 is located in a trough 60 the lip 62 of which lies in a substantially horizontal plane which is substantially coplanar with, but not above, the top of the roller and means not shown, but which may conveniently comprise the same pump 21 employed to provide suction or compressed air to the first and second work stations, are provided for drawing air from the trough thereby sucking the sheet down on to the roller 46 to be engaged and advanced by it.

In the embodiment of the apparatus illustrated, which is suitable for the lamination of a flexible sheet to the advancing sheet after it has been coated with adhesive, a mounting such as a rod 48 may be provided to support a roll 50 of the flexible sheet 52 which is to be laminated to the advancing sheet and means such as 54 are provided for guiding the leading edge of a sheet unrolled from the roll so that it hangs just upstream of the rollers 44, 46 and in the path of the advancing sheet, and with the end of the flexible sheet below the path of the advancing sheet. The nose of the advancing sheet then engages the hanging part of the flexible sheet 52 just above its end and pushes the flexible sheet through the nip between the rollers 44, 46 thereby applying the flexible sheet 52 progressively to the adhesive-coated top surface of the advancing sheet as the latter advances towards the second work station.

Figure 8:
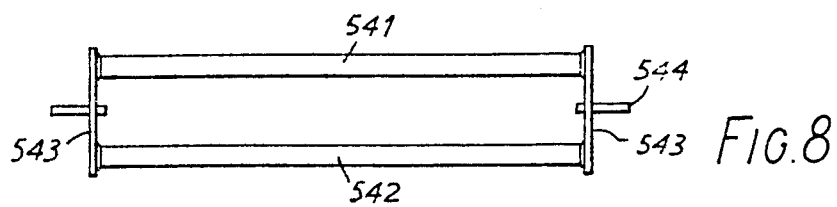
FIG. 8 is an enlarged view of the guide and tension means 54 of the apparatus of FIG. 1.

The means 54 is conveniently a combined guide and tension means which places the flexible sheet 52 under tension during its application to the advancing sheet. Referring to FIG. 8 this device may be of known form, comprising a pair of parallel spaced bars 541, 542 connected by frame members 543, pivotable about an axis 544 parallel to and between the bars 541 and having means (not shown) for locking the assembly at any desired position about the axis. The flexible sheet is fed passed around the rollers as shown in FIG. 1 such that anti-clockwise rotation of the device increases the tension and vice versa.

A hot wire cutting means 55 is located downstream of the second sheet advancing means for cutting the length of flexible sheet 52 which has been applied to the adhesively-coated surface of the advancing sheet from the roll 50. Further cutting means (not shown) may be provided for trimming the edges of the sheet 52 if it is wider than sheet 8. The cutting means 55 may suitably be actuated automatically by means such as a photoelectric cell or microswitch (not shown) actuated by movement of the sheet past a predetermined point.

In the embodiment illustrated, a further nip is provided downstream of the cutting means, comprising a driven roller 56 which is mounted above and towards the upstream end of the table surface 16 of the second work station. As in the case of roller 44, this roller 56 is mounted on a pivotable arm 58 so that it rests on the workpiece by gravity, automatically adjusts its distance from the table surface 16 to accommodate workpieces of different thicknesses and can be lifted away from the workpiece when desired, by means of the assembly of lever 58A and coil spring 58B. Conveniently, rollers 40, 46 and 56 are all driven by the same motor 42.

If desired, at least one further station may be located between the third and second work stations, where an adhesively-coated sheet recovered from the third work station may be held while an operation is performed on another sheet at the second work station. The means for supporting the sheet or other workpiece at said further work station may comprise a support surface with air cushion or air bearing means for supporting the workpiece just clear of the surface, e.g. as in the first and second work stations. Alternatively, the support means may comprise rollers, for example.

The first and second sheet advancing means may, if desired, be reversible e.g. so that a workpiece, such as laminate which has just been formed on the apparatus, and which is located at the second work station, may be returned to the first work station through the third work station and have a layer of adhesive applied to its top surface en route so that a further lamina may be bonded to it. In this embodiment, the first work station may also be provided with a lid comprising a substantially gas-impermeable flexible sheet, such as the lid 22 illustrated in FIGS. 1 and 2, movable between a first position in which the horizontal support surface of the work station is exposed and a second position in which the gas-impermeable flexible sheet covers the support surface, and means for withdrawing gas through the support surface from the space between the membrane and the support surface whereby to evacuate the space. There may also be at least one further station between the third and first work stations where a workpiece returning from the second work station through the third work station may be held e.g. while an operation is performed on another sheet at the first work station.

While the apparatus may be employed in the production of a variety of different laminates, it is particularly adapted for the production of laminates containing glass sheet and especially laminated mirror products wherein mirror glass is bonded to a backing sheet, such as the products sold under the names 'Diamond Mirror' and 'Diamond 8'.

The operation of the apparatus will now be described with reference to the production of a laminate comprising a glass mirror bonded to a rigid backing board with the interposition of a porous membrane comprising a flexible and resiliently compressible foamed plastics sheet having a layer of nylon scrim bonded to each side.

In step (1) of the process, the membrane is bonded to the board. To this end, a roll of the nylon scrim-faced foamed plastics sheet is supported on mounting rod 48 and the free end is passed over combined tension device and guide 54 so that it hangs in the path of a sheet travelling from the first work station through the third work station to the second.

A rigid backing board such as 'Monolux' or 'Masterboard' or of rigid foamed plastic, and of the appropriate size, is located at the first station by lowering it on to the surface 10 so that it lies over the pistons 131 which are thus depressed flush with the work surface by its weight. Compressed air is supplied to plenum chamber 14 and thence through ports 12 whereby to form an air cushion or air bearing under the sheet to lift it slightly clear of the table surface and render it readily manoeuvrable. The board is then firstly moved clear of the pistons 131, thus enabling them to spring proud of the table surface, and then moved back so that one edge rests against the pistons, thus positioning it for processing. Motor 42 is started and the pumping of air from trough 60 is commenced. The board is advanced by hand until its leading edge is caught in the nip between motor driven rollers 39 and 40 which advance the sheet at a pre-determined velocity through the third work station and under adhesive applicator nozzle(s) 36 which dispense adhesive on to the upper face of the board.

As the nose of the board leaves the adhesive application zone, it engages the flexible foamed plastics sheet which is hanging down from a roll thereof supported by mounting rod 48 and is so guided by tension and guide means 54 that it hangs directly in the path of the advancing board with the end of the foamed sheet hanging sufficiently far below the level of the advancing board that as the board continues forward the foamed sheet is engaged by the board and pushed by the nose of the board into the nip of rollers 44, 46, thereby forcing upper roller 44 upwards against gravity. Advancement of the board through the machine is continued by motor driven roller 46 against which the lower face of the board is sucked by the vacuum being created in the trough 60. Continued advance of the sheet through the nip of rollers 44, 46 causes a length of the foamed sheet to be unwound from the roll thereof under the tension applied by tensioning means 54 and pressed on to the top surface of the board. The board, with the foamed sheet being applied to it, passes under hot knife 55 and through the nip between motor driven roller 56 and the support surface 16 of the second work station. As the tail of the board passes the hot knife 55 and with the foamed sheet pressed on to the board by the roller 56, the knife is actuated to sever the foamed sheet from the roll thereof.

Before the board reaches the second station, compressed air is supplied to plenum chamber 20 and thence through ports 18 in the support surface 16 so that as the board enters the second station it is supported by an air bearing or air cushion.

When the board has arrived at its correct position at the second work station, the direction of air through the ports 18 is reversed so that the board is sucked down on to the surface 16 and securely held in position there. Lid 22 is then closed over the assembly of board and membrane whereby the flexible gas-impermeable sheet 24 is sucked down onto the assembly by the continued extraction of air through ports 18, thus pressing the porous membrane firmly on to the board while the bond sets. Simultaneously, the pressure within the porous membrane is reduced and residual solvent vapour from the adhesive sucked out through the membrane.

A vacuum time of a few seconds to a few minutes and typically about one minute is usually adequate.

The vacuum is then released and the lid opened. This completes step (1) of the process. In step (2), a coating of adhesive is applied to the exposed surface of the porous membrane. To this end, the assembly of board and membrane is returned to the first station and again passed through to the second station as described above but with the differences that (a) no further length of membrane is applied, (b) rollers 44 and 56 are lifted clear of the top surface of the assembly so that they do not come into contact with the adhesive-coated surface, and (c) the step of closing the lid 22 over the assembly at the second work station is omitted. The adhesive-coated product so obtained may then be stored if desired.

The third step (3) involves bonding the glass mirror to the adhesive-coated assembly of board and membrane. A rigid carrying board which is at least as large as the glass mirror is located at the first work station and the mirror is placed face, i.e. glass side, downwards on it. The carrying board is used because with the combinations of glass thickness and sheet size generally employed in the production of the mirror laminates, the glass sheet may be insufficiently rigid if unsupported. At larger thicknesses and/or smaller sizes, however, the carrying board can be omitted if desired although its use also helps to protect the glass surface against scratching. The back of the mirror is cleaned and degreased and the board carrying the mirror is then passed through the apparatus as described in step (2) above to deposit a coating of adhesive on the exposed surface of the mirror. After the adhesive-coated mirror has arrived at the second work station and has been sucked down onto the support surface, the adhesive-coated assembly of board and membrane which was formed in steps (1) and (2) is positioned adhesive-coated face down onto the adhesive-coated face of the mirror. The assembly is then turned over so that the board is at the bottom and the glass at the top and the carrying board is removed if desired. The lid 22 is closed and vacuum is applied through ports 18 as in step (1) above while the bond sets fully, in order to press the glass firmly against the membrane and simultaneously suck adhesive solvent vapours from the bond line through the membrane. A vacuum time of a few seconds to a few minutes and typically about one minute is usually adequate.

The lid is then opened and the mirror laminate removed.

If desired, in step (3) the glass mirror may be smaller in length and breadth than the assembly to which it is to be bonded and a disposable protective sheet, e.g. of cardboard or plastics, and which is larger than the glass mirror, is placed between the carrying board and the mirror such that the exposed areas of the upper surface of the sheets are coated with adhesive and become bonded to those areas of the assembly of membrane and board which extend beyond the mirror when the latter is applied over the mirror, thereby providing the glass surface of the laminate with a protective coating.

Where the mirror surface of the laminate comprises a pattern of smaller mirror pieces, the pattern may be formed face down on the carrier board (or on the protective sheet, if used) and a suitable sealant such as a silicone sealant may be applied to the gaps between the adjacent pieces before the application of the adhesive.

It will be appreciated that a plurality of mirror laminates may be produced in a single operation by applying several small mirrors to a larger assembly of board and membrane, sufficiently spaced apart that the product may subsequently be cut into its separate parts each comprising one of the small mirrors.

The apparatus may also be used to produce a laminate of mirror and porous membrane for subsequent bonding to a backing surface such as a wall or ceiling of a building. This is achieved in the manner of step (1) of the process described above but with the modification that the rigid backing board is replaced by a sheet of mirror placed face (i.e. glass side) down at the first work station, supported, if desired, on a carrier board as described in step (3). Preferably, the mirror is placed face down on a disposable sheet or board which is larger than the mirror and which can be used as a temporary protection for the mirror surface, and the width and length of the porous membrane employed are such that it extends beyond the mirror all round and the parts which extend beyond the mirror become bonded to the corresponding parts of the sheet or board so as to encapsulate the mirror. An inner protective layer e.g. of plastics film may be located between the glass surface of the mirror and the disposably sheet or board, if desired.

The porous membrane may have a non-porous film, e.g. of polyurethane or polyurethane-coated pvc, bonded to that surface which is not bonded to the mirror, so that it forms a surface of the eventual laminate.

The apparatus of the invention may also be employed in an alternative method of forming a mirror laminate which comprises (a) applying to either the back surface of the mirror or the support surface, a foam-forming composition capable of expanding and setting to a solid foam which will bond to said mirror back surface and said support surface, (b) with the surface to which the composition is applied being substantially horizontal, locating the other surface a predetermined distance above the coated surface, and causing or allowing the composition to expand to fill the space between the said surfaces and to set. Preferably the foam-forming composition is applied to the back surface of the mirror.

In this alternative method of employing the apparatus, a mirror sheet is placed face down on support surface 10 at the first work station 2, if necessary or desired on a carrier board, and, in the manner described in step (3), above is passed from this station through the third station to the second station and is coated with adhesive. However, in this case a foam-forming adhesive composition is employed and, if desired, the first station may include means for heating the mirror to cause or assist the adhesive composition which contacts the heated mirror surface to foam.

At the second work station, suction is applied to plenum chamber 20 and thence through the ports 18 to hold the coated mirror firmly in position on support surface 16. A substantially rigid board of suitable dimensions is then located at a spaced distance above the coated surface of the mirror by means of a spacer and the composition is caused or allowed to foam and completely fill the space between the mirror and the board and to set, thereby firmly bonding the board to the mirror.

Preferably, lid 22 is closed over the assembly during the foaming and setting and suction through the ports 18 is continued so as to cause the gas-impermeable sheet 24 to press against the board and prevent it lifting under the pressure of the foaming, and to assist the foaming reaction. The spacer is preferably drilled or otherwise provided with means for letting any excess foam escape.

In a preferred embodiment, the board is located correctly on top of the coated mirror by providing lid 22 with means for locating and holding the board on the lid when the lid is in the open position and so that when the lid is closed over the coated mirror the board is correctly positioned on top of the mirror.

This method of producing a mirror laminate enables good bonding between the back of the mirror and a board having an uneven surface.

The composition employed preferably foams and sets to form a flexible and resiliently compressible foam plastics or rubber layer. However, products having a high fire rating may be obtained by using a fire-resistant foam forming composition such as 'ACELL' of Company 'A' Foam Limited of England or Trixone F 1175 filled with Baco FRF powder or aluminium trihydrate and a mirror in which the reflective surface is aluminium, e.g. Spectra Float sold by Pilkingtons of England.

What is claimed is:

1. A method of bonding a mirror to a substantially rigid backing board or other support surface by means of a solvent-based adhesive, the method comprising forming the laminate of mirror and said support surface with a layer of porous material between and including the step of bonding the mirror and/or the backing board or other support surface to the layer by means of a solvent-based adhesive and extracting adhesive solvent vapour from the bond line of the assembly so formed by suction through the porous layer.

2. A method as claimed in claim 1 which includes the step of applying solvent-based adhesive to the back of the mirror and wherein said solvent-based adhesive is applied by spraying using compressed gas at a pressure which causes volatilisation of a substantial part of the solvent before the adhesive contacts the back of the mirror.

3. A method as claimed in claim 1 wherein suction through the porous layer is effected by locating the assembly in an enclosure having a flexible wall and evacuating the enclosure whereby to collapse the flexible wall against a face of the assembly and thereby simultaneously apply pressure to the assembly in a direction normal to the plane of the bond.

4. A method as claimed in claim 1 in which the porous layer is of a size such that it extends beyond the edge of the mirror around the entire periphery thereof and a protective sheet for the transparent face of the mirror and which also is of a size such that it extends beyond the edge of the mirror around the entire periphery thereof is bonded to the exposed faces of the porous layer surrounding the mirror simultaneously with the bonding of the layer to the mirror.

5. A method as claimed in claim 1 in which a pattern of a plurality of spaced pieces of mirror is bonded to the porous layer and a sealant is applied between the spaces on the back surface of the mirror prior to the contacting of said surface with the adhesive.

6. A method as claimed in claim 1 which comprises the steps of
    (1) bonding a face of the porous layer to a face of a substantially rigid backing board using a solvent-based adhesive and extracting adhesive solvent vapour from the bond line of the assembly so formed by suction through the porous layer;
    (2) applying a solvent-based adhesive to the other face of the porous layer and causing or allowing it to become at least touch dry;
    (3) applying a solvent-based adhesive to the back of the mirror and
    (4) before the adhesive applied in step (3) has dried applying the adhesive-coated surface of the mirror to the adhesive-coated surface of the product of step (2) and extracting adhesive solvent vapour from the bond line of the assembly so formed by suction through the exposed edges of the porous layer.

* * * * *